United States Patent
Han et al.

(10) Patent No.: US 9,075,075 B2
(45) Date of Patent: Jul. 7, 2015

(54) AVERAGE PITOT TUBE TYPE FLOW METER

(71) Applicant: Dae Han Instrument Co., Ltd., Gyeonggi-do (KR)

(72) Inventors: Sang Hie Han, Gyeonggi-do (KR); Seung June Song, Seoul (KR)

(73) Assignee: Dae Han Instrument Co., Ltd., Gyeonggi-do (KR)

( * ) Notice: Subject to any disclaimer, the term of this patent is extended or adjusted under 35 U.S.C. 154(b) by 66 days.

(21) Appl. No.: 14/064,656

(22) Filed: Oct. 28, 2013

(65) Prior Publication Data
US 2015/0114136 A1   Apr. 30, 2015

(51) Int. Cl.
*G01F 1/46*   (2006.01)
*G01P 5/165*   (2006.01)

(52) U.S. Cl.
CPC ..................... *G01P 5/165* (2013.01)

(58) Field of Classification Search
CPC ........................................... G01F 1/46
USPC ........................ 73/861.66, 861.65
See application file for complete search history.

(56) References Cited

U.S. PATENT DOCUMENTS

| 4,297,900 | A | * | 11/1981 | Brandt, Jr. | 73/861.66 |
| 5,481,925 | A | * | 1/1996 | Woodbury | 73/861.66 |
| 5,736,651 | A | * | 4/1998 | Bowers | 73/861.66 |
| 6,044,716 | A | * | 4/2000 | Yamamoto | 73/861.66 |
| 6,237,426 | B1 | * | 5/2001 | Gryc et al. | 73/861.66 |
| 7,597,009 | B1 | * | 10/2009 | VandeBerg | 73/861.66 |
| 8,342,036 | B2 | * | 1/2013 | Khimji | 73/861.65 |

FOREIGN PATENT DOCUMENTS

| JP | 09101186 | 4/1997 |
| KR | 20120119880 | 10/2012 |

* cited by examiner

*Primary Examiner* — Jewel V Thompson
(74) *Attorney, Agent, or Firm* — Bachman & LaPointe, P.C.

(57) ABSTRACT

Average pitot-tube type flow meter according to the present invention has a total pressure tube and a static pressure tube. The total pressure tube and the static pressure tube are spaced from each other. Across the total pressure tube and the static pressure tube, a rectifying device and a connection case are installed as they are integrated into one body. The rectifying device is positioned in advance of total pressure holes and the total pressure hole and a static pressure hole are positioned inside the connection case.

14 Claims, 7 Drawing Sheets

AVERAGE PITOT TUBE TYPE FLOW METER

BACKGROUND OF THE INVENTION

The present invention relates to an average pitot-tube type flow meter and, more particularly, to the average pitot-tube type flow meter that does not require straight run so that the degree of freedom for its installation is enhanced.

When an average pitot tube type flow meter is mounted on a pipe, the water flow in advance of and behind the average pitot-tube type flow meter should be stabilized so that straight runs are required in advance of and behind the average pitot-tube type flow meter.

If it is difficult to secure the straight run length, a rectifying device can be installed to reduce the straight run length.

The rectifying device has a multiple of tubes arranged in parallel one another and the section of the tube can have various shapes. Such a rectifying device is defined in ISO 516701 and so on.

As the fluid passes the plural tubes arranged in parallel one another in the rectifying device, the distribution of the velocity from the wall to the center in the pipe becomes uniform.

The rectifying device includes, for example, Zanker type, Sprenkie type, AMCA type and Etoile type.

However, even if the rectifying device is used, the straight run is still necessary. So, there remains the limit in the installation and inconvenience to install the rectifying device in advance of the pitot-tube type flow meter as well as to install the pitot-tube type flow meter.

Accordingly, a pitot-tube type flow meter is demanded that does not need the straight run so that it is possible to enhance the degree of freedom in the installation and that can eliminate the inconvenience to install the rectifying device separately.

Meanwhile, in the conventional pitot-tube type flow meter, the total pressure tube and the static pressure tube are integrated to one body and they are separated by the separation wall. For example, Korean patent No. 0201077 shows such a structure. However, there is a problem that it is not easy to manufacture the total pressure tube and the static tube integrated to one body.

SUMMARY OF THE INVENTION

The first purpose of the present invention is to provide a pitot-tube type flow meter where the straight run is not necessary so that the degree of freedom in installation is enhanced and inconvenience to additionally install the rectifying device is eliminated so that it is easy to install.

The second purpose of the present invention is to provide a pitot-tube type flow meter where the straight run is not necessary so that the degree of freedom in installation is enhanced, inconvenience to additionally install the rectifying device is eliminated so that it is easy to install, and the total pressure tube and the static pressure tube are separately formed so that it is easy to manufacture.

The present invention provides an average pitot-tube type flow meter comprising: a total pressure tube on which a plurality of total pressure holes are formed along its longitudinal direction, the total pressure tube provided in a pipe to be perpendicular to a direction of fluid flow in the pipe; a static pressure tube on which a plurality of static pressure holes are formed along the longitudinal direction of the static pressure tube, the static pressure tube provided in the pipe to be perpendicular to the direction of fluid flow in the pipe and positioned at the back of the total pressure tube; and a plurality of rectifying devices, the respective rectifying device provided in advance of the respective total pressure holes; wherein, the total pressure tube and the static pressure tube are connected to a differential pressure gauge.

According to the present invention, it is desirable if the rectifying device includes a case of which a front part and a rear part are open and a plurality of tubes arranged in parallel one another along the direction of the fluid flow inside the case.

According to the present invention, it is desirable if section of the plural tubes has a honeycomb shape.

According to the present invention, it is desirable if a plurality of plates is arranged in a radial form inside the case and spaces between the plates form the plurality of tubes.

According to the present invention, it is desirable if the plurality of tubes is provided to be contact with one another on their sides.

According to the present invention, it is desirable if a plurality of connection cases is further provided, a front part and a rear part of each of the plural connection cases open, each of the connection cases being provided across the total pressure tube and the static pressure tube, and the total pressure hole and the corresponding static pressure hole thereto located inside the connection case.

According to the present invention, it is desirable if the connection case is coupled to the case of the rectifying device.

According to the present invention, it is desirable if the connection case and the case of the rectifying device are integrated into one body.

According to the present invention, it is desirable if the total pressure tube and the static pressure tube are spaced from each other along the direction of fluid flow.

According to the present invention, it is desirable if the total pressure tube and the static pressure tube are provided in a tube and they are separated by a partition wall in the tube.

According to the present invention, it is desirable if the total pressure tube and the static tube penetrate the connection cases in a vertical direction thereto and each of the connection cases is provided to be across the total pressure tube and the static tube.

According to the present invention, it is desirable if the total pressure tube and the static tube are connected to a flange at their upper parts, respectively.

According to the present invention, the straight run is not necessary and the degree of freedom for its installation is very high. The rectifying device is integrated thereinto and the inconvenience to install the rectifying device separately is eliminated. Further, the total pressure tube and the static pressure tube can be mounted as they are spaced from each other and it becomes easy to manufacture.

DETAILED DESCRIPTION

The preferred embodiments of the present invention are described with reference to the accompanying drawings.

Figure 1:
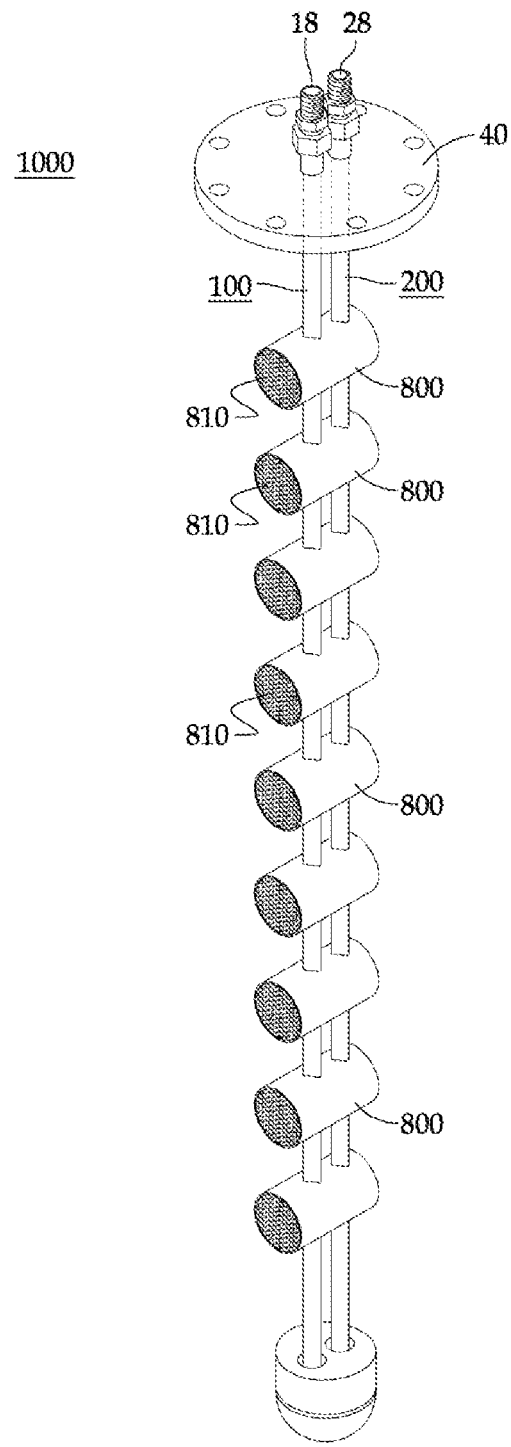
FIG. 1 shows an average pitot-tube type flow meter according to an embodiment of the present invention.
Figure 2:
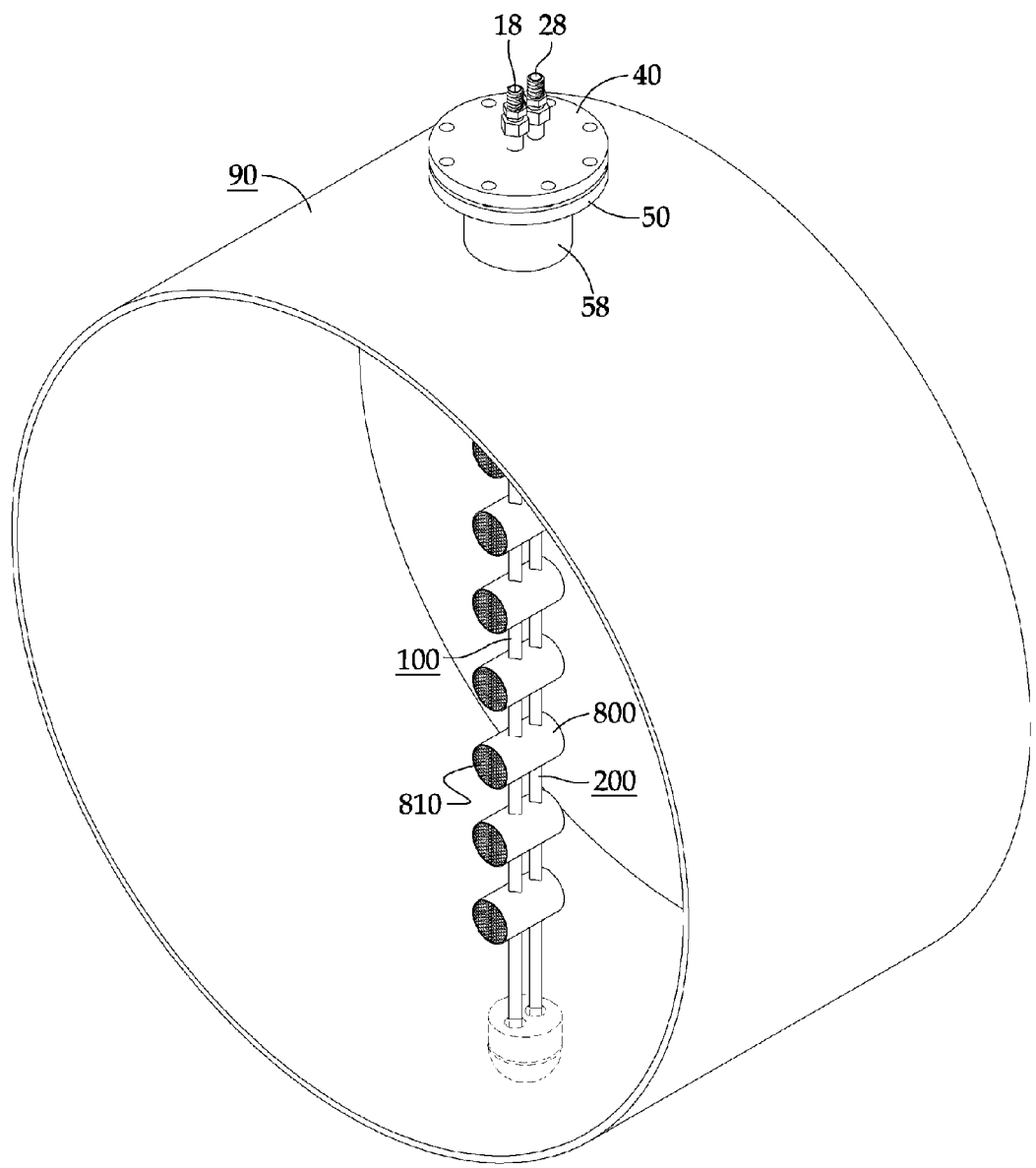
FIG. 2 shows that the pitot-tube type flow meter of FIG. 1 is mounted in a pipe.

FIG. 1 shows an average pitot-tube type flow meter 1000 according to an embodiment of the present invention and FIG. 2 shows that the average pitot-tube type flow meter 1000 is installed in a pipe 90.

Figure 3:
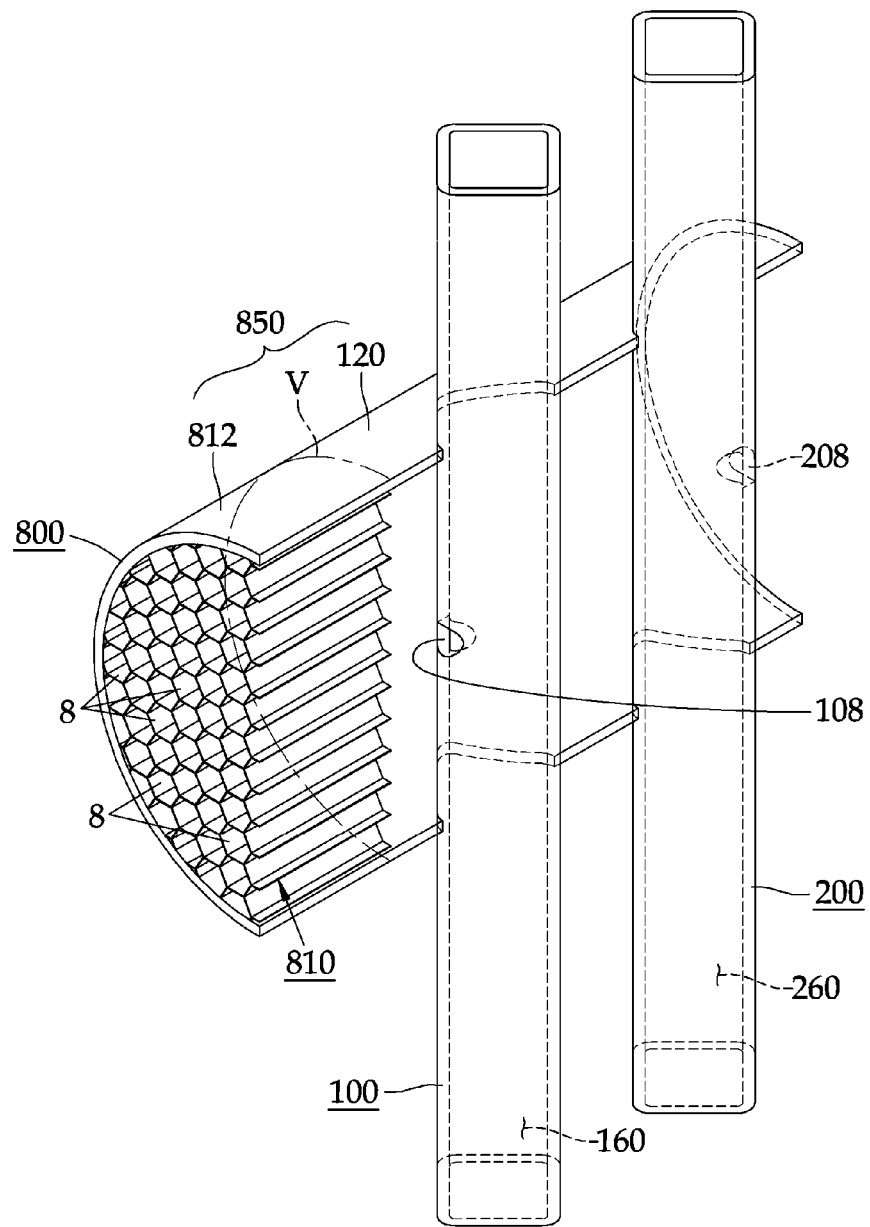
FIG. 3 shows the structure of a rectifying device and a connection case according to the embodiment of the present invention.
Figure 4:
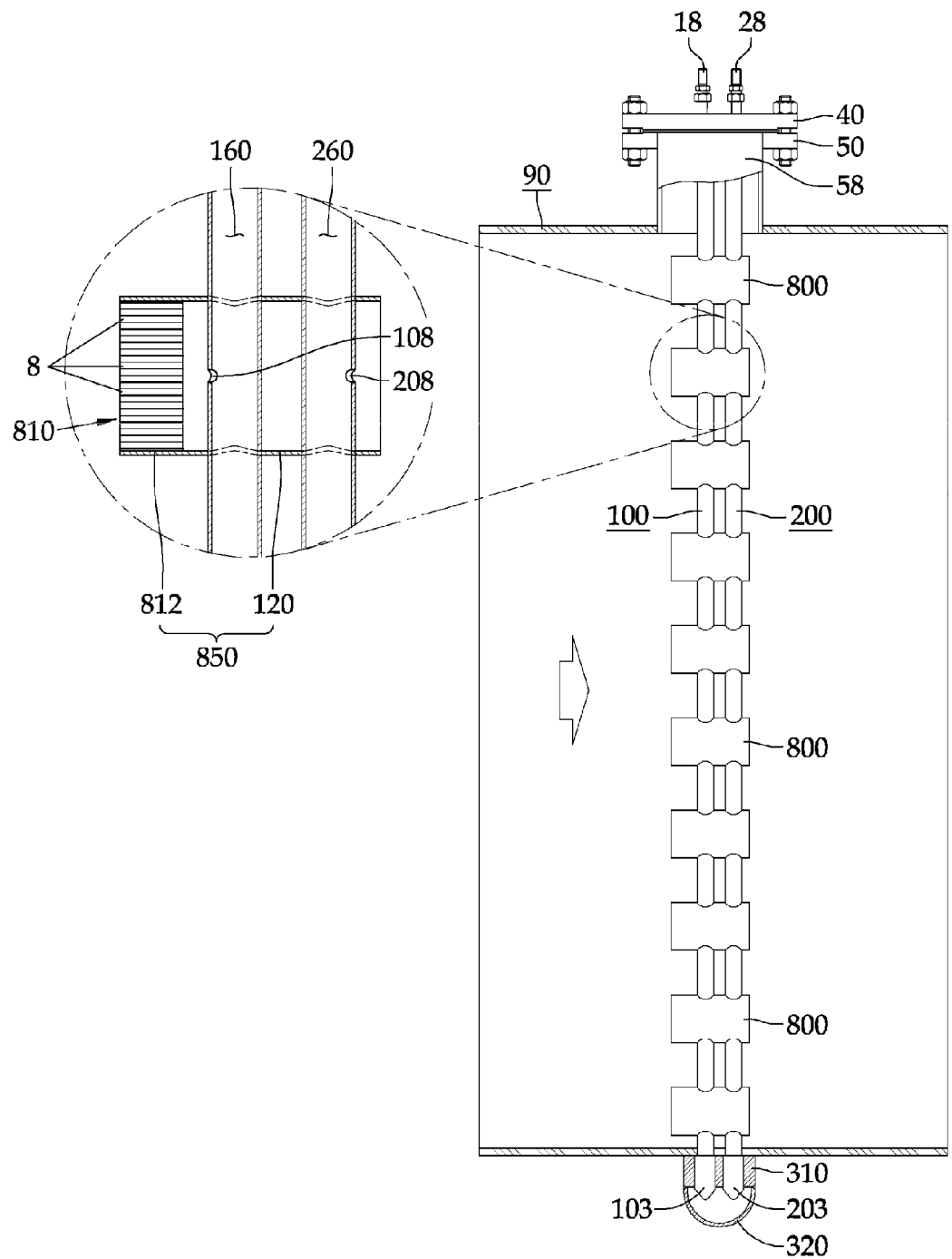
FIG. 4 shows the structure of the pitot-tube type flow meter of FIG. 1 mounted in the pipe.

As shown, a total pressure tube 100 and a static pressure tube 200 are provided and they have a plurality of total pressure holes 108 and a plurality of static pressure holes 208 along their longitudinal directions, respectively (refer to FIGS. 3 and 4).

The total pressure tube 100 and the static pressure tube 200 are installed along the direction perpendicular to fluid flow.

Each of the total pressure tube 100 and the static pressure tube 200 has a valve (not shown) through connection pipes 18 and 28, and they are connected to a differential pressure gauge (not shown) and the difference (dynamic pressure) between the pressure formed in the total pressure tube 100 and pressure formed in the static pressure tube 200 is measured and fluid flow velocity and fluid flow is derived from the measured dynamic pressure.

A rectifying device 810 is mounted in front of the respective total pressure hole 108 in the total pressure tube 100.

With reference to FIG. 3, the rectifying device 810 has a case 812 where a front and a rear thereof are open and a plurality of tubes 8 arranged in parallel one another along the direction of the fluid flow in the case 812. According to the present embodiment, the section of the plural tubes 8 has a honeycomb shape.

According to the present embodiment, the total pressure tube 100 and the static pressure tube 200 are spaced from each other along the direction of the fluid flow.

With reference to FIG. 1, a flange 40 is provided and the total pressure tube 100 and the static pressure tube 200 are coupled with the flange 40 at their upper part, respectively and the total pressure tube 100 and the static pressure tube 200 are connected to the connection pipes 18 and 28 on the flange 40, respectively. The connection pipes 18 and 28 are connected to the differential pressure gauge (not shown) through the valves (not shown) and the pressures formed in the insides 160 and 260 of the total pressure tube 100 and the static pressure tube 200, respectively are delivered to the differential pressure gauge.

With reference to FIGS. 3 and 4, a connection case 120 is mounted across the total pressure tube 100 and the static pressure tube 200 and the total pressure hole 108 and the corresponding static pressure hole 208 thereto is located inside the connection case 120. The front and the rear of the connection case 120 are open.

The total pressure tube 100 and the static pressure tube 200 vertically penetrate the connection case 120, respectively and the connection case 120 is mounted across the total pressure tube 100 and the static pressure tube 200.

The case 812 for the rectifying device 810 and the connection case 120 are coupled to each other. In the present embodiment, the case 812 and the connection case 120 are integrated to one body and form an entire case 850. The designation V indicates an imaginary line distinguishing the case 812 and the connection case 120 in the entire case 850.

Accordingly, the rectifying device 810 and the connection case 120 is formed into one body as a whole and it is indicated by numeral 800.

With reference to FIGS. 1, 2 and 4, the total pressure tube 100 and the static pressure tube 200 are mounted to be vertical to the flow-path of the pipe 90 and a lower flange 50 coupled to a connection pipe 58 is coupled to the flange 40 at the top of the pipe 90.

The total pressure tube 100 and the static pressure tube 200 have pins 103 and 203 at their lower part, respectively and they are extruded out through the lower part of the pipe 90 and an adapter 310 where couple holes to which the pins 103 and 203 are coupled are formed is welded to the bottom surface of the pipe 90 and a cap 320 is welded to the adapter 32.

Figure 5:
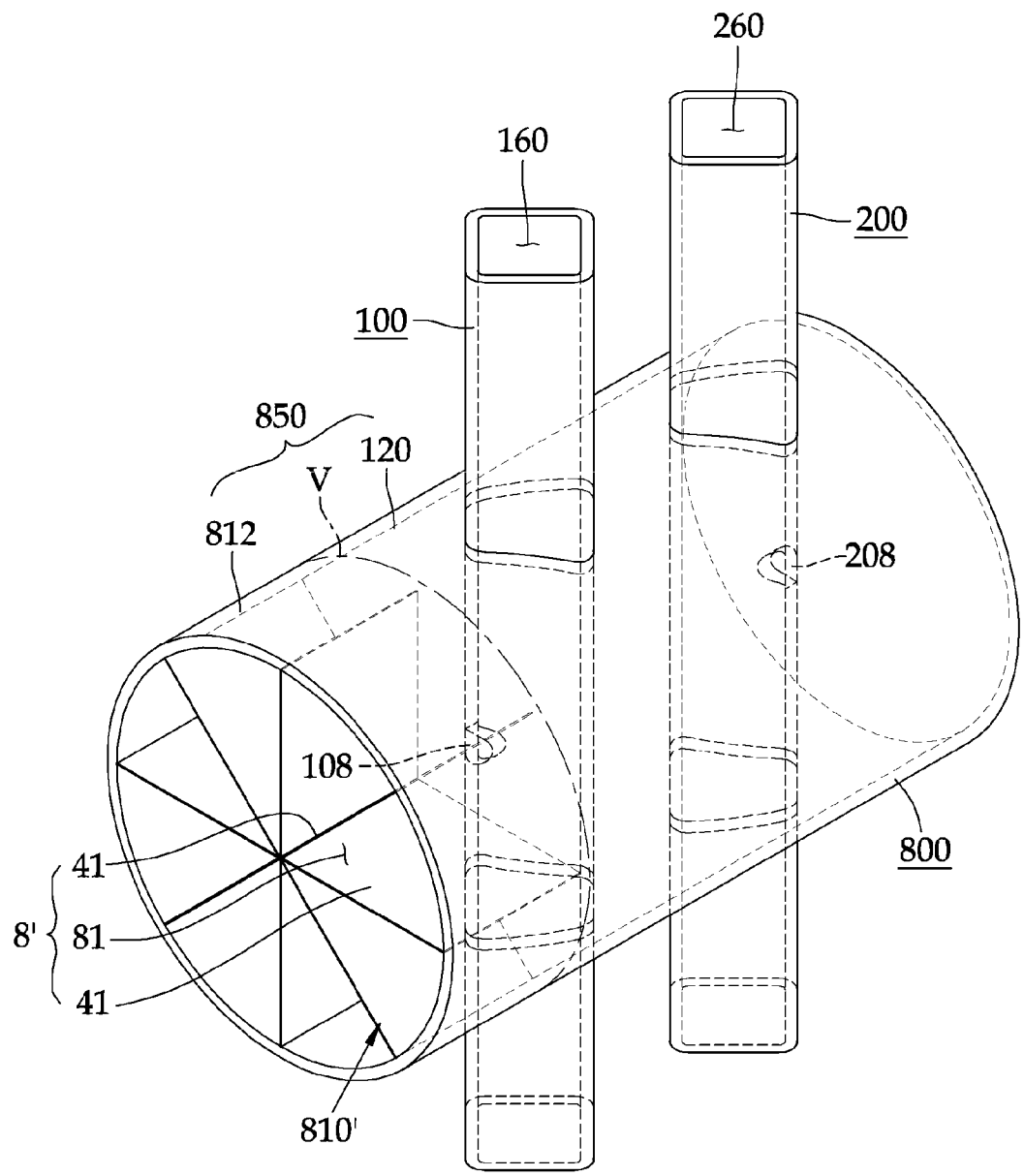
FIGS. 5 and 6 show other rectifying devices.

FIG. 5 shows another rectifying device 810' according to another embodiment. Inside of the case 812 of the rectifying device 810', a plurality of plates 41 are arranged in radial form and spaces 81 between the plates 41 form tubes 8'. Substantially, it is the etoile type rectifying device.

Figure 6:
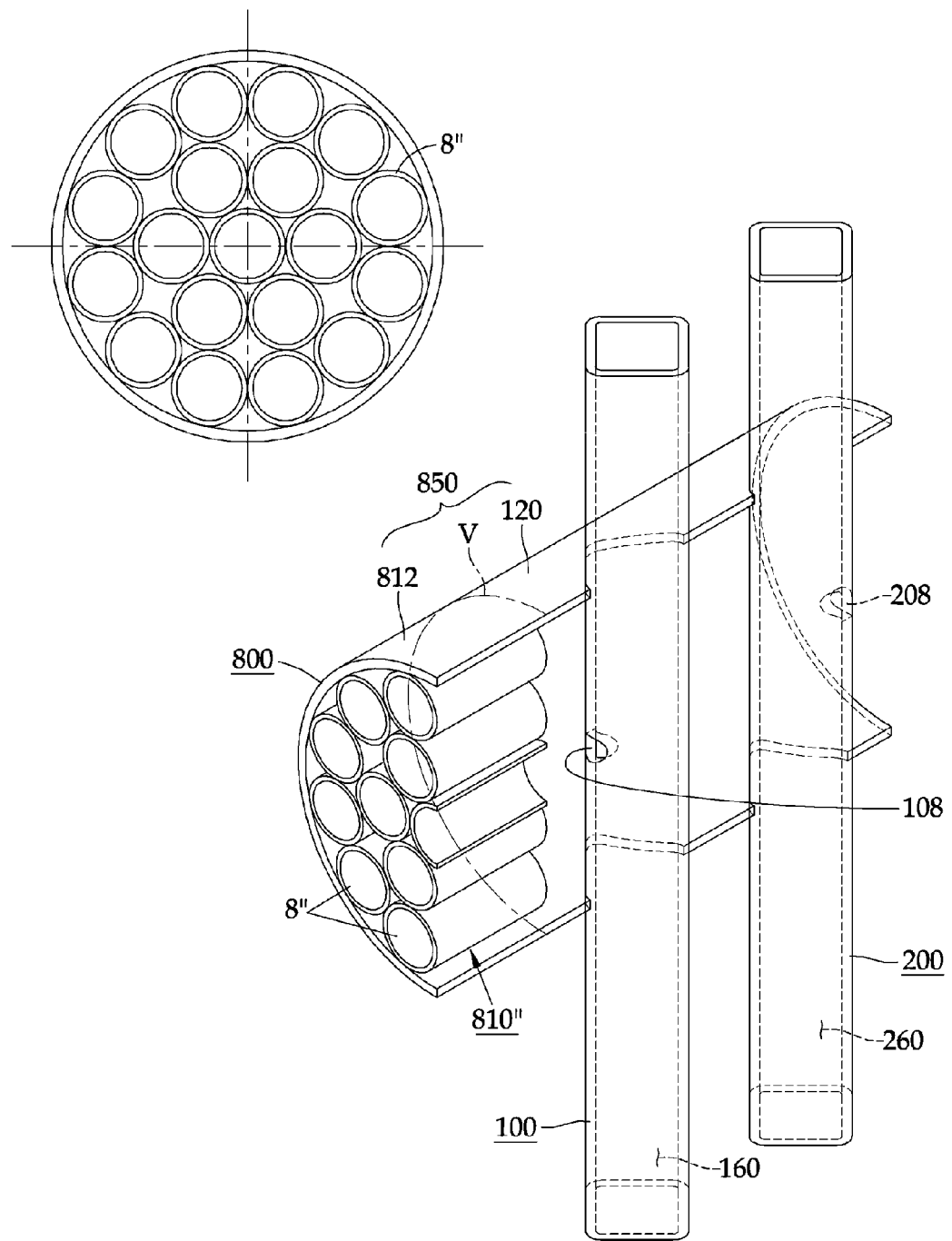

FIG. 6 shows another rectifying device 810" according to another embodiment of the rectifying device. Inside of the case 812 of the rectifying device 810", a plurality of tubes 8" are arranged to be contact with one another at their sides.

Figure 7:
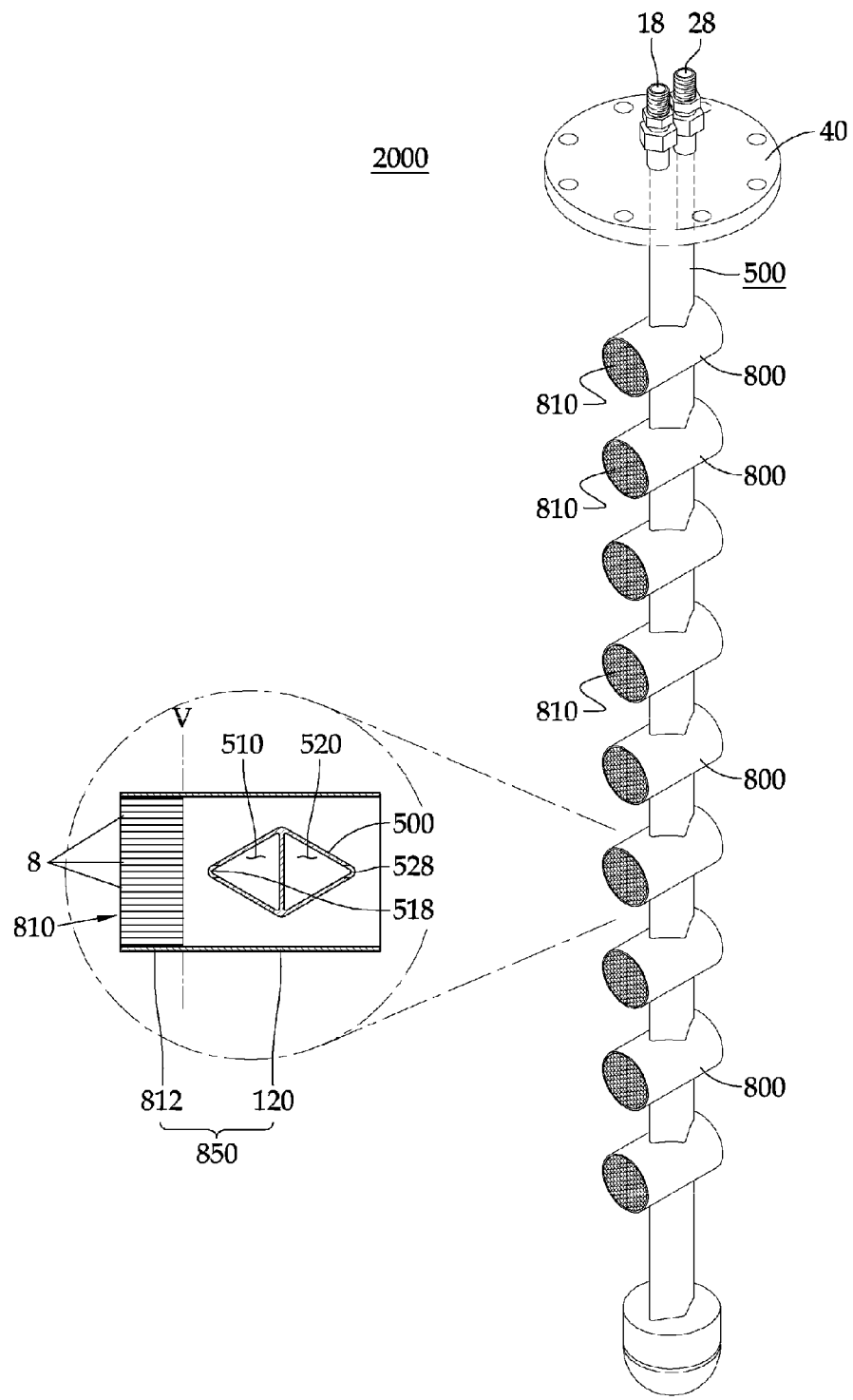
FIG. 7 shows an average pitot-tube type flow meter according to another embodiment of the present invention.

FIG. 7 shows other average pitot-tube flow meter 2000 according to other embodiment of the present invention.

In the first embodiment, the total pressure tube 100 and the static pressure 200 are separated and spaced from each other. In this second embodiment, a tube 500 is provided and, in the tube 500, a total pressure tube 510 and a static pressure tube 520 are formed and they are separated by a partition wall. Each of the total pressure tube 510 and the static pressure tube 520 has a plurality of total pressure holes 518 and a plurality of static pressure holes 528 along their longitudinal directions, respectively.

In the front of the respective total pressure holes 518 of the tube 500, the rectifying device 810 is provided. The connection case 120 is provided across the tube 500 and the front and the rear of the case 120 are open. The case 812 of the rectifying device 810 and the connection case 120 are integrated into the entire case 850.

As describe, according to the present invention, in front of the respective total pressure holes 108 and 518, the rectifying device 810 is provided so that the fluid flow for the respective total pressure hole 108 and 518 is stabilized and the straight run is not necessary.

Also, according to the present invention, the total pressure tube 100 and the static pressure tube 200 are spaced from each other and they are connected to each other by the connection case 120 so that the strength of the total pressure tube 100 and the static pressure tube 200 along the longitudinal direction is enhanced and kept.

Further, according to the present invention, the total pressure tube 100, 510 and the static pressure tube 200, 520 are connected by the connection tube 120 and the fluid flow there behind does not influence on the static pressure hole 208 and 528.

The average pitot-tube type flow meters 1000 and 2000 according to the present invention were tested and it is found that the pitot coefficient keeps constant value in spite that the straight run length is kept less than the diameter of the pipe 90.

As described, according to the present invention, the straight run is not necessary and the degree of freedom for its installation is very high. The rectifying device is integrated thereinto and the inconvenience to install the rectifying device separately is eliminated. Further, the total pressure tube and the static pressure tube can be mounted as they are spaced from each other and it becomes easy to manufacture.

The invention claimed is:

1. Average pitot-tube type flow meter comprising:
   (a) a total pressure tube on which a plurality of total pressure holes are formed along its longitudinal direction, the total pressure tube provided in a pipe to be perpendicular to a direction of fluid flow in the pipe;
   (b) a static pressure tube on which a plurality of static pressure holes are formed along the longitudinal direction of the static pressure tube, the static pressure tube provided in the pipe to be perpendicular to the direction of fluid flow in the pipe and positioned at the back of the total pressure tube; and (c) a plurality of rectifying devices, the respective rectifying device provided in advance of the respective total pressure holes; wherein, (d) the total pressure tube and the static pressure tube are connected to a differential pressure gauge.

2. The average pitot-tube type flow meter as claimed in claim 1 wherein the rectifying device includes a case of which a front part and a rear part are open and a plurality of tubes arranged in parallel one another along the direction of the fluid flow inside the case.

3. The average pitot-tube type flow meter as claimed in claim 2 wherein section of the plural tubes has a honeycomb shape.

4. The average pitot-tube type flow meter as claimed in claim 2 wherein a plurality of plates is arranged in a radial form inside the case and spaces between the plates form the plurality of tubes.

5. The average pitot-tube type flow meter as claimed in claim 2 wherein the plurality of tubes is provided to be contact with one another on their sides.

6. The average pitot-tube type flow meter as claimed in claim 2 further comprising a plurality of connection cases, a front part and a rear part of each of the plural connection cases open, each of the connection cases being provided across the total pressure tube and the static pressure tube, and the total pressure hole and the corresponding static pressure hole thereto located inside the connection case.

7. The average pitot-tube type flow meter as claimed in claim 6 wherein the connection case is coupled to the case of the rectifying device.

8. The average pitot-tube type flow meter as claimed in claim 7 wherein the connection case and the case of the rectifying device are integrated into one body.

9. The average pitot-tube type flow meter as claimed in claim 6 wherein the total pressure tube and the static pressure tube are spaced from each other along the direction of fluid flow.

10. The average pitot-tube type flow meter as claimed in claim 6 wherein the total pressure tube and the static pressure tube are provided in a tube and they are separated by a partition wall in the tube.

11. The average pitot-tube type flow meter as claimed in claim 6 wherein the total pressure tube and the static tube penetrate the connection cases in a vertical direction thereto and each of the connection cases is provided to be across the total pressure tube and the static tube.

12. The average pitot-tube type flow meter as claimed in claim 6 wherein the total pressure tube and the static tube are connected to a flange at their upper parts, respectively.

13. The average pitot-tube type flow meter as claimed in claim 1 wherein the total pressure tube and the static pressure tube are spaced from each other along the direction of fluid flow.

14. The average pitot-tube type flow meter as claimed in claim 1 wherein the total pressure tube and the static pressure tube are provided in a tube and they are separated by a partition wall in the tube.

* * * * *